(12) United States Patent
Faibish et al.

(10) Patent No.: US 11,153,385 B2
(45) Date of Patent: Oct. 19, 2021

(54) LEVERAGING NAS PROTOCOL FOR EFFICIENT FILE TRANSFER

(71) Applicant: EMC IP Holding Company LLC, Hopkinton, MA (US)

(72) Inventors: Sorin Faibish, Newton, MA (US); Philip Shilane, Newtown, PA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/547,768

(22) Filed: Aug. 22, 2019

(65) Prior Publication Data
US 2021/0058459 A1    Feb. 25, 2021

(51) Int. Cl.
| H04L 29/08 | (2006.01) |
| H04L 9/06 | (2006.01) |
| H04L 1/00 | (2006.01) |

(52) U.S. Cl.
CPC ........ H04L 67/1097 (2013.01); H04L 1/0061 (2013.01); H04L 9/0643 (2013.01); H04L 67/06 (2013.01)

(58) Field of Classification Search
CPC ..... H04L 67/146; H04L 67/22; H04L 61/303; H04L 67/02; H04L 61/1511; G06F 16/955
See application file for complete search history.

(56) References Cited

U.S. PATENT DOCUMENTS

| 8,712,963 B1 * | 4/2014 | Douglis | G06F 11/2056 707/637 |
| 8,751,462 B2 | 6/2014 | Huang et al. | |
| 8,935,446 B1 | 1/2015 | Shilane et al. | |
| 9,021,297 B1 * | 4/2015 | Hayes | G06F 12/0246 714/6.3 |
| 9,110,964 B1 * | 8/2015 | Shilane | G06F 16/178 |
| 9,317,218 B1 | 4/2016 | Botelho et al. | |
| 9,952,933 B1 * | 4/2018 | Zhang | G06F 11/1453 |
| 10,459,886 B2 * | 10/2019 | Tripathy | G06F 16/1752 |
| 2006/0184652 A1 * | 8/2006 | Teodosiu | H03M 7/30 709/221 |
| 2008/0010411 A1 * | 1/2008 | Yang | G06F 12/0866 711/122 |
| 2012/0173558 A1 * | 7/2012 | Sorenson, III | G06F 16/23 707/758 |
| 2013/0080406 A1 * | 3/2013 | LaRiviere | H04L 67/06 707/692 |
| 2013/0311433 A1 * | 11/2013 | Gero | H03M 7/3091 707/692 |

(Continued)

OTHER PUBLICATIONS

Naki et al., "Support for File System Extended Attributes in NFSv4", Jul. 18, 2014, NFSv4 Working Group Internet Draft (Year: 2014).*

(Continued)

*Primary Examiner* — Yves Dalencourt
*Assistant Examiner* — Kidest Mendaye
(74) *Attorney, Agent, or Firm* — BainwoodHuang

(57) ABSTRACT

A technique for transferring data over a network leverages a standard NAS (Network Attached Storage) protocol to augment its inherent file-copying ability with fingerprint matching, enabling the NAS protocol to limit its data copying over the network to unique data segments while avoiding copying of redundant data segments.

17 Claims, 8 Drawing Sheets

(56) References Cited

U.S. PATENT DOCUMENTS

2017/0322794 A1* 11/2017 Ferlitsch ................. H04L 67/10
2019/0045077 A1* 2/2019 Irons .................. H04N 1/32144

OTHER PUBLICATIONS

Dell EMC, "Dell EMC Data Domain Boost for Partner Integration, Version 3.4", May 2017.
M Naik, "File System Extended Attributes in NFSv4" Internet Engineering Task Force (IETF), Dec. 2017.

* cited by examiner

LEVERAGING NAS PROTOCOL FOR EFFICIENT FILE TRANSFER

BACKGROUND

Users of computer networks commonly transfer files from one computer to another. Such transfers may involve copying, moving, replicating, migrating, or backing up files or their data, for example. Some file transfers occur automatically, such as those performed during scheduled backups. Other file transfers are user-initiated. In a typical file-copying arrangement, a user operates a GUI (Graphical User Interface) or a CLI (Command Line Interface) of an operating system on a source computer. Common examples of operating systems include Windows®, Unix®, Linux, OSX®, and so forth. The user may open a first window that shows the contents of a local folder on the source computer. The user may also open a second window that shows the contents of a remote folder on the destination computer (e.g., via a mapped network drive, export, or share, for example). Next, the user selects a file from the local folder in the first window and drags and drops the selected file into the second window. Performing the drag-and-drop initiates a network copy of the selected file from the local folder to the remote folder.

Behind the scenes, a NAS (Network Attached Storage) protocol orchestrates the copying activity. Common examples of NAS protocols include NFS (Network File System) and CIFS (Common Internet File System). The NAS protocol directs the destination computer to create a destination file that corresponds to the selected file at the source and manages the copying of data blocks or other data segments from the source file to the newly created destination file. At the conclusion of the copying, the destination file contains an independent copy of the source file, with the destination file backed by persistent storage on the destination computer.

SUMMARY

Unfortunately, conventional NAS protocols can place high bandwidth demands on computer networks. For example, copying a 1 GB (Gigabyte) file over a network can be time consuming and can displace other network traffic, which can itself become slow, resulting in degraded performance and unsatisfactory user experience.

Certain software programs promote efficiency in copying data over a network by computing fingerprints of data at a source computer and comparing them with fingerprints of data at a destination computer. Any matching fingerprints indicate that the destination already stores the associated source data, such that copying the corresponding data over the network can be avoided. An example of a program of this type is Data Domain Boost, available from Dell/EMC Corporation of Hopkinton, Mass.

Although programs such as Data Domain Boost are effective at improving efficiency when copying data over a network, they can also be complex to manage. For example, such programs can employ custom protocols that present compatibility and maintenance challenges. They also lack integration with NAS protocols and can be inconvenient for users, who need to use a separate program if they want more efficient network copying.

In contrast with prior approaches, an improved technique for transferring data over a network leverages a standard NAS (Network Attached Storage) protocol to augment its inherent file-copying ability with fingerprint matching, enabling the NAS protocol to limit its data copying over the network to unique data segments while avoiding copying of redundant data segments. Advantageously, significant stress on the network is avoided, promoting performance of any applications using the network and improving user experience. Maintenance and software management are also improved, as the standard NAS protocol avoids the need for an extra, custom protocol.

Certain embodiments are directed to a method of transferring data between computing machines over a network. The method includes sending, via a NAS (Network Attached Storage) protocol and in response to a first computing machine receiving a request to transfer file data to a second computing machine, a first transmission to the second computing machine over the network. The first transmission includes multiple fingerprints that identify respective data segments of the file data. The method further includes receiving, via the NAS protocol, reply data from the second computing machine. The reply data specifies missing data segments. The missing data segments are data segments, identified by the fingerprints in the first transmission, which are unavailable on the second computing machine. In response to receiving the reply data, the method further includes sending, via the NAS protocol, a second transmission to the second computing machine. The second transmission provides the missing data segments to the second computing machine. Other embodiments are directed to a computerized system constructed and arranged to perform a method of transferring data between computing machines over a network, such as the method described above. Still other embodiments are directed to a computer program product storing instructions which, when executed on control circuitry of a computerized apparatus, cause the computerized apparatus to perform a method of transferring data between computing machines over a network, such as the method described above.

Additional embodiments are directed to a computer program product, including a set of non-transitory, computer-readable media having instructions which, when executed by a controller of a computerized apparatus, cause the computerized apparatus to perform a method of transferring data over a network. The method includes operating a NAS (Network Attached Storage) server configured to share or export files over the network, and receiving, via a NAS protocol of the NAS server, a first transmission from a computing machine that operates a NAS client, the first transmission including multiple fingerprints that identify respective data segments of file data. The method further includes transmitting, via the NAS protocol, reply data to the computing machine, the reply data specifying missing data segments, the missing data segments being data segments, identified by the fingerprints in the first transmission, which are unavailable on the computerized apparatus. After transmitting the reply data, the method includes receiving, via the NAS protocol, a second transmission from the computing machine, the second transmission providing the missing data segments. Related embodiments are directed to methods and computerized systems that transfer data between computing machines over a network.

Still further embodiments are directed to a computerized system that includes a first computing machine operatively connected to a second computing machine over a network. The computerized system is constructed and arranged to receive, by the first computing machine, a request to transfer file data to the second computing machine, and send, by the first computing machine via a NAS (Network Attached Storage) protocol, a first transmission to the second computing machine, the first transmission including multiple fingerprints that identify respective data segments of the file data. The computerized system is further constructed and arranged to transmit, by the second computing machine via the NAS protocol, reply data to the first computing machine, the reply data specifying missing data segments, the missing data segments being data segments, identified by the fingerprints in the first transmission, which are unavailable on the computerized apparatus. In response to receiving the reply data by the first computing machine, the computerized system is constructed and arranged to send, by the first computing machine via the NAS protocol, a second transmission to the second computing machine, the second transmission providing the missing data segments to the second computing machine. Related embodiments are directed to methods and computer program products that transfer data between computing machines over a network.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views. The drawings are not necessarily to scale, emphasis instead being placed upon illustrating the principles of various embodiments.

DETAILED DESCRIPTION

Embodiments of the improved technique will now be described. One should appreciate that such embodiments are provided by way of example to illustrate certain features and principles but are not intended to be limiting.

An improved technique for transferring data over a network leverages a standard NAS (Network Attached Storage) protocol to augment its inherent file-copying ability with fingerprint matching, enabling the NAS protocol to limit its data copying over the network to unique data segments while avoiding copying of redundant data segments.

Figure 1:
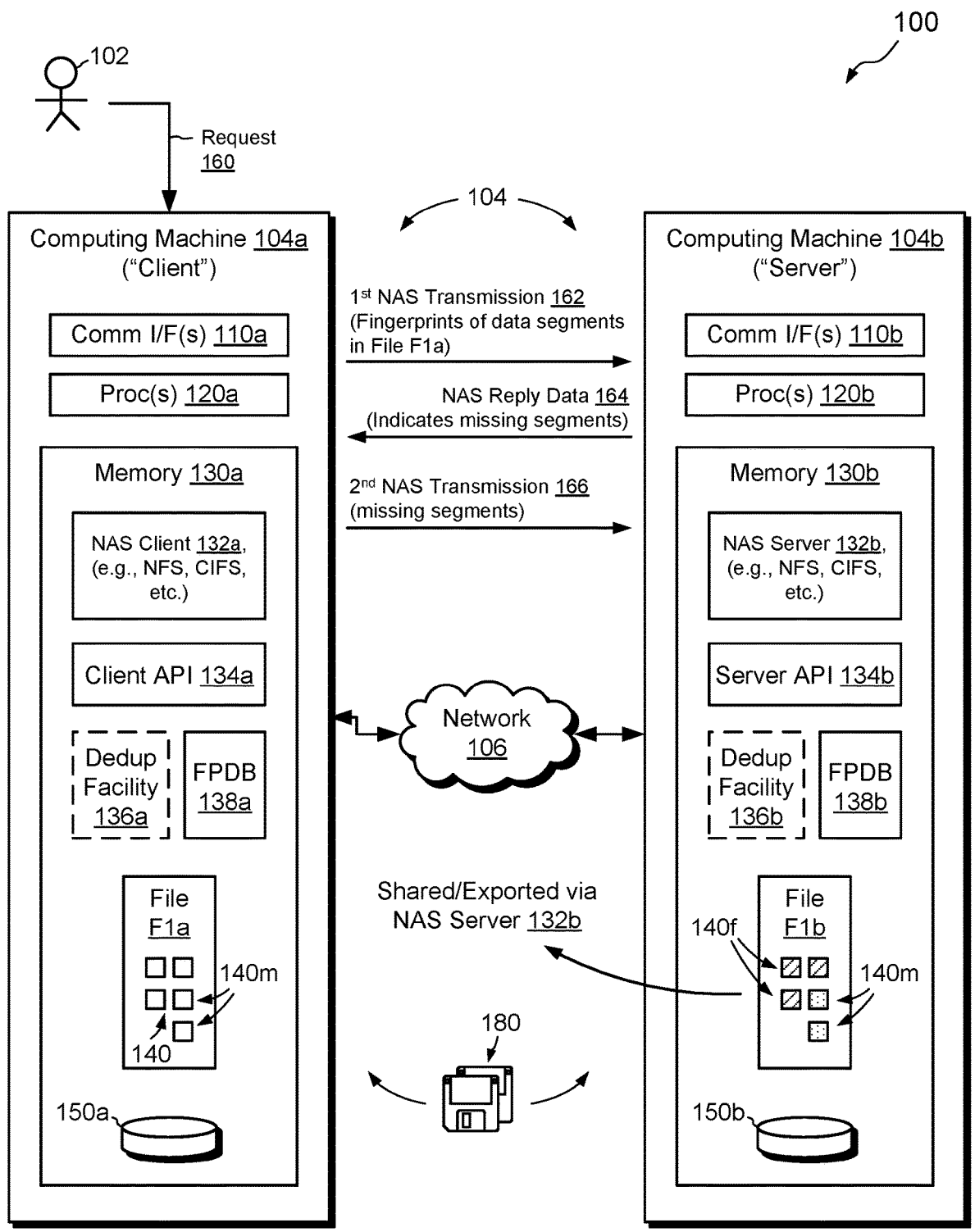
FIG. 1 is a block diagram of an example environment in which embodiments of the improved technique can be practiced.

FIG. 1 shows an example environment 100 in which embodiments of the improved technique can be practiced. As shown, environment 100 includes a first computing machine 104a ("Client") and a second computing machine 104b ("Server") operatively connected together over a network 106. Each computing machine 104 can be any type of computerized device, such as a desktop computer, laptop computer, server blade, cloud-based computer, storage processor of a data storage array, smart phone, tablet computer, personal data assistant, set top box, game console, or the like. The computing machines 104 may be physical machines or virtual machines. There is no need for the first and second computing machines 104a and 104b to be of the same type. Although two computing machines 104 are specifically shown, the technique as disclosed herein may be extended to greater than two computing machines.

The computing machines 104 need not reside at the same location. For example, the first computing machine 104a may be located on premises of an organization, whereas the second computing machine 104b may be located remotely, such as at another site of the organization or in the cloud. The cloud may be a public cloud or a private cloud. The improvements hereof are particularly well suited to cloud-based implementations of the second computing machine 104b, given that copying data to cloud storage is often slower than copying data locally and minimizing the amount of data transferred can effect large performance gains. Different locations are not required, however.

The network 106 may be any type of network or combination of networks, such as a local area network (LAN), a wide area network (WAN), an intranet, the Internet, and/or some other type of network or combination of networks, for example. The network 106 may be wired (e.g., Ethernet), wireless (e.g., Wi-Fi, Bluetooth, cellular), and/or may include both wired and wireless portions. The network 106 is configured to convey data, e.g., using TCP/IP (Transfer Control Protocol, Internet Protocol) or some other protocol, and the data may include file-based data. The network 106 is compatible with standard NAS protocols, such as NFS and CIFS.

The computing machines 104a and 104b each include one or more communication interfaces 110a or 110b (e.g., any number of Ethernet ports, Wi-Fi antennas, etc., and associated hardware), one or more processors 120a or 120b (e.g., one or more microprocessors, chips, assemblies, etc.), and memory 130a or 130b. The memory may include both volatile memory, e.g., RAM (Random Access Memory), and non-volatile (persistent) memory 150a or 150b, such as one or more disk drives, solid state drives, or flash drives, for example.

Each memory 130a or 130b includes a variety of software constructs realized in the form of executable instructions. When the executable instructions are run by the respective set of processors 120a or 120b, the set of processors carry out the operations of the software constructs. Such executable instructions may be embodied as a computer program product 180 including one or more non-transitory, computer-readable storage media, such as one or more magnetic disks, magnetic tapes, compact disks, DVDs, optical disks, flash drives, solid state drives, SD (Secure Digital) chips, Application Specific Integrated Circuits (ASICs), Field Programmable Gate Arrays (FPGAs), and/or the like. Any number of computer-readable media may be used. The media may be encoded with instructions which, when executed on the set of processors 120a or 120b, perform the method or methods described herein. Such media may be considered articles of manufacture or machines, and may be transportable from one machine to another. Although certain software constructs are specifically shown and described, it is understood that each of the memories 130a and 130b typically includes many other software components, which are not shown, such as an operating system, various applications, processes, and daemons.

As further shown in FIG. 1, the memory 130a of computing machine 104a "includes," i.e., realizes by execution of software instructions, a NAS client 132a, a client API (Application Programming Interface) 134a, a fingerprint database (FPDB) 138a, and any number of files, such as file F1a. In some examples, the memory 130a also includes a deduplication ("Dedup") facility 136.

The NAS client 132a may be an NFS client or a CIFS client, for example, and is configured to communicate with a NAS server of the same type (NFS or CIFS), such as NAS server 132b on the second computing machine 104b. NAS server 132b is configured to export or share folders over the network 106, and NAS client 132a is configured to access those exported or shared folders, e.g., for performing standard CRUD operations, i.e., Create, Read, Update, and Delete.

Client API 134a is configured to support the NAS client 132a in using fingerprints when exchanging file data. For example, the client API 134a gathers fingerprints of specified file data to be transferred, identifies data segments for missing fingerprints (those not found at the server), and forms commands in accordance with the NAS protocol of the NAS client 132a, e.g., for sending and receiving data and metadata as needed. If the fingerprints of specified file data do not already exist, e.g., if no deduplication facility 136a is present or if a desired fingerprint has not yet been created, then the client API 134a may also generate any needed fingerprints. The client API 134a thus enables consumers of that API (e.g., users and/or applications) to use the NAS protocol for performing fingerprint-enabled data transfer.

Fingerprint database 138a is configured to store fingerprints of file data in the computing machine 104a. As described more fully below, the fingerprints may be cryptographically-secure fingerprints computed from data segments of files, e.g., using SHA-1 or SHA-2 hash functions. Alternatively, the fingerprints may be non-cryptographically-secure but may still be capable of uniquely identifying data segments within a particular scope, such as that of a particular tenant (user, organization, etc.) or client. Computing machines 104 may generate non-cryptographically-secure fingerprints using any suitable methodology, provided that the methodology is shared between or among the computing machines 104. Sharing of the methodology enables fingerprint-based matching of data segments across different computing machines 104. In general, cryptographically-secure fingerprints are preferred when the computing machine 104a uses a deduplication facility 136a, as the digests computed for deduplication may also serve as fingerprints for data transfer. Conversely, non-cryptographically-secure fingerprints may be preferred when no deduplication facility 136a is present, as non-cryptographically-secure fingerprints are generally less computationally intensive to compute than are cryptographically-secure fingerprints. They can also be smaller, with 64 bits being sufficient in many cases.

The deduplication facility 136a (if present) is configured to reduce redundancy among data segments in computing machine 104a by replacing redundant copies of data segments with pointers to a single retained copy (or a smaller number of such copies). The deduplication facility 136a may operate by computing hash values of data segments (e.g., using SHA-1 or SHA-2) and using the hash values as representatives of those data segments. The data segments may be data blocks (e.g., 4-kB or 8-kB blocks), but this is not required, as any data denomination may be used and sizes need not be uniform. The deduplication facility 136a can remove duplicates or can avoid their initial creation (e.g., with inline deduplication). When the deduplication facility 136a receives a candidate data segment, it hashes the segment and performs a lookup into a digest database using the hash value as a key. The digest database associates hash values with corresponding locations of already-stored data segments that produced those hash values. If a lookup succeeds in finding a match, the deduplication facility 136a replaces the candidate data segment with a pointer to the location stored for the matching segment in the digest database. The space for storing the candidate data segment can then be released, or its initial storage can be avoided (in the inline case). In some examples, as described above, the digest database or a portion thereof also serves as the fingerprint database 138a.

As shown to the right of FIG. 1, the memory 130b of the second computing machine 104b includes the above-mentioned NAS server 132b, a server API 134b, a fingerprint database 138b, and any number of files, such as file F1b. The memory 130b may optionally include a deduplication facility 136b. The NAS server 132b (e.g., a NFS server or CIFS server) is configured to establish exports or shared folders that are local to the second computing machine 104b. The exported or shared folders are then available to be accessed by the NAS client 132a (or by any number of such clients). In NFS terminology, a folder may be "exported" by an NFS server and "mounted" by an NFS client. In CIFS terminology, a folder may be "shared" by a CIFS server and "mapped" by a CIFS client.

The server API 134b is configured to support the NAS server 132b in using fingerprints when exchanging file data. For example, the server API 134b performs matching between incoming fingerprints from computing machine 104a and local fingerprints stored in the local fingerprint database 136b. Based on the fingerprint matching, the server API 134b prepares a list of missing data segments. It also forms commands in accordance with the NAS protocol of the NAS server 132b for sending and receiving data and metadata as needed. If fingerprints for specified data segments on the second computing machine 104b do not already exist, then the server API 134b may generate those fingerprints. The server API 134b thus enables consumers of that API (e.g., users and/or applications) to use the NAS protocol for performing fingerprint-enabled data transfer.

The fingerprint database 138b performs a similar role as the fingerprint database 138a, except that its contents include fingerprints of data segments on the second computing machine 104b. On both machines 104, the fingerprint database may be realized as a persistent structure, an in-memory structure, or a structure having both persistent and in-memory components. In a like manner, the deduplication facility 136b, if present, performs a similar role as the deduplication facility 136a, except that its operation is limited to data segments on the second computing machine 104b.

In some examples, machines 104 include both a NAS client 132a and a NAS server 132b, so that they can both export/share their own folders and access folders exported or shared from elsewhere on the network 106. In such cases, the NAS client 132a and NAS server 132b may be provided as a single component. Likewise, the client API 134a and server API 134b may be provided together as a single API.

Also, any policies for communicating between the client API 134a and the server API 134b are preferably established during initialization, such as during a mount operation for NFS or during a map network drive operation for CIFS. The policies may specify, for example, the format of the fingerprints and methodology for computing them, the size (or sizes) of data segments on the NAS client side, the size (or sizes) of data segments on the NAS server side, identities of any extended attributes used, and any other settings or capabilities needed to support the use of fingerprints when transferring file data.

In example operation, the first computing machine 104a encounters a request 160 to transfer file data of a local file to a specified folder that has been exported or shared from elsewhere on the network 106. The request 160 may originate from a user 102, e.g., by the user 102 operating a GUI or CLI of the first computing machine 104a. The user 102 may specify a particular file and, if applicable, a particular logical offset range within the file. Alternatively, the request 160 may originate internally within the first computing machine 104a, e.g., upon the triggering of an automatic backup or replication procedure, or in some other way. For this example, we assume that user 102 has issued a command to transfer file F1a, which is local to the first computing machine 104a, to a folder that has been exported or shared by the second computing machine 104b.

In response to the request 160, client API 134a identifies data segments 140 in the file F1a and obtains fingerprints of those data segments 140 (e.g., by computing them directly from the data segments and/or by accessing them from the fingerprint database 138a). Client API 134a provides a list of the fingerprints of the data segments 140 to the NAS client 132a. The NAS client 132a receives the list of fingerprints and sends the list in a first NAS transmission 162 to the NAS server 132b. The NAS client 132a may send the list of fingerprints as one or more NAS extended attributes, as payload data using RPC (Remote Procedure Call), or via some other mechanism.

The NAS server 132b on the second computing machine 104b receives the list of fingerprints, and the server API 134b checks each of the fingerprints on the list to determine whether a corresponding data segment is already stored on the second computing machine 104b. For example, the server API 134b performs lookups of the listed fingerprints in the fingerprint database 138b and/or computes fingerprints of local data segments, comparing them with the fingerprints on the list. The result is a set of found data segments 140f and a set of missing data segments 140m. In some examples, the server API 134b expresses the set of missing data segments 140m by marking the received list. For instance, the server API 134b marks each fingerprint on the received list with a Boolean value (true or false), which indicates whether that fingerprint is present or missing. Various encodings are possible, and those described are not intended to be limiting.

The server API 134b makes the encoding of the set of missing data segments available to the NAS server 132b, and the NAS server 132b provides that encoding in reply data 164, which the NAS server 132b returns to the NAS client 132a. The client API 134a on the first computing machine 104a obtains the reply data 164 and proceeds to gather the missing data segments 140m.

The client API 134a provides the missing data segments 140m to the NAS client 132a, which sends the missing data segments 140m in a second transmission 166 to the NAS server 132b, e.g., as ordinary NAS data payload, which may be compressed or uncompressed. The NAS server 132b receives the second transmission 166, including the missing data segments 140m.

At this point or earlier, the NAS server 132b constructs a container for receiving the transferred data of file F1a. As shown, the container is provided as a file F1b, which is configured to be a copy of file F1a. The NAS server 132b directs the second computing machine 104b to populate the file F1b with data segments identified by the list of fingerprints. These data segments include the found data segments 140f, where are already stored on the second computing machine 104b, and the missing data segments 140m, which were just received. For the found data segments 140f, the second computing machine 104 may perform a local copy of those data segments to file F1b, or it may accomplish a similar result by adjusting pointer metadata, i.e., by inline deduplicating the found data segments 140f. For the missing data segments 140m, the second computing machine 104b places the data segments into the file F1b at the appropriate locations. As a result of this activity, the second computing machine 104b realizes an independent copy of file F1a as new file F1b, while having only to receive the missing data segments 140m over the network. Transmission of found data segments 140f is therefore avoided.

In some examples, the NAS server 132b computes a checksum of the file F1b, using CRC32, MD5, or some other hash value. The NAS server 132b compares the checksum with one generated for the file F1a using the same approach. If the verification codes match, the NAS server 132b may return a successful result. Otherwise, the NAS server 132b may return an unsuccessful result, in which case the data transfer may be retried. In some examples, the NAS server 132b computes the checksum and sends it to the NAS client 132a. The NAS client 132a then compares the received checksum with one generated for file F1a, producing a successful or unsuccessful result. In some examples, the checksum is applied only to the data that has been identified for transfer, rather than to the file as a whole. In further examples, the checksum is applied only to the missing data segments 140m.

Figure 2:
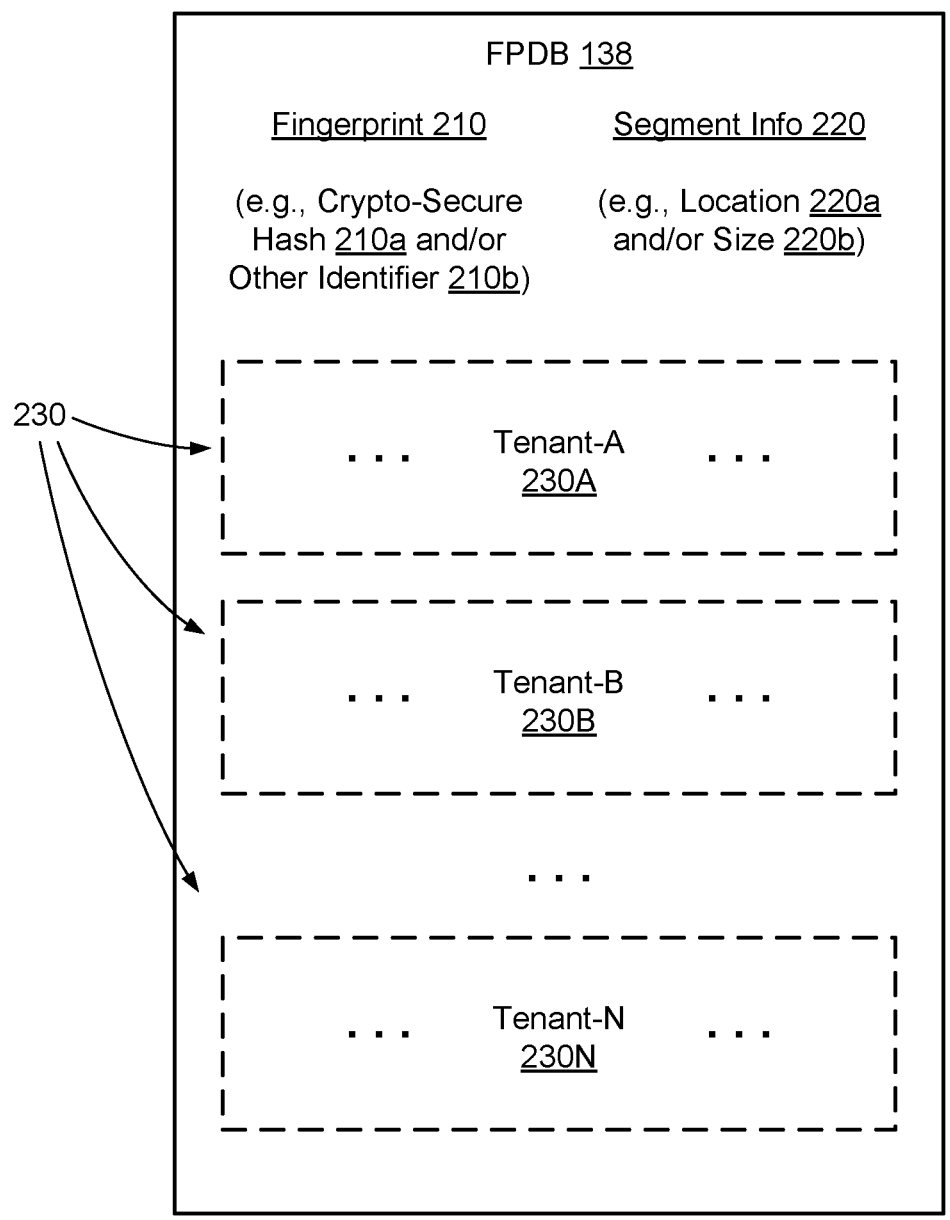
FIG. 2 is a block diagram of an example fingerprint database which may be used in connection with computing machines shown in FIG. 1.

FIG. 2 shows an example fingerprint database 138 in additional detail. The fingerprint database 138 may be representative of fingerprint databases 138a and 138b in computing machines 104a and 104b, respectively. However, there is no requirement that the fingerprint databases 138a and 138b be identical.

As shown, the fingerprint database 138 relates fingerprints 210 to respective information 220 about the data segments from which the fingerprints 210 were created. Such information 220 may include, for example, a location 220a of each listed data segment and a size 220b of each such data segment. The fingerprint database 138 may express the location 220a as a cache location and/or as a persistent storage location in the local computing machine 104. The fingerprints 210 themselves may be cryptographically-secure fingerprints 210a (e.g., SHA-1 or SHA-2 hash values), or they may be other identifiers 210b.

In some examples, the fingerprint database 138 organizes fingerprints 210 based on tenant 230 (e.g., Tenant A, Tenant B, . . . Tenant N), where each tenant 230 is provided for a respective entity, such as a person, organization, department, or the like. A distinguishing feature of tenants 230 is that they generally wish to keep their data separate from that of other tenants, e.g., for privacy, security, and/or compliance reasons. In general, each client (104a) may belong to a single tenant, but the server (104b) may supply data for multiple tenants 230.

In an example, the fingerprint database 138 separates its contents for different tenants 230 in respective regions 230A, 230B, . . . 230N, where each region is provided for one tenant only. Organizing fingerprints 210 based on tenant 230 promotes isolation among different tenants' data. It also enables tenants to use non-cryptographic fingerprints as identifiers 210b without risking collisions. For example, when performing lookups in the fingerprint database 138 in response to receiving requests from a particular tenant (e.g., Tenant A), the NAS server 132b may limit the scope of its lookup to region 230A. Restricting the scope of lookups to a particular tenant region prevents collisions between fingerprints generated for two different data segments belonging to two different tenants 230. Similar restrictions apply when storing fingerprints 210b in the fingerprint database 138. Thus, a fingerprint 210 generated for Tenant A should be stored only in region 230A and nowhere else. Similar rules apply to the other tenants 230. Although cryptographically-secure hashes 210a may be universally unique, the fingerprint database 138 may nevertheless, in some cases, apply the same per-tenant separation as described for non-cryptographic identifiers 210b, as part of an effort to maintain separation between different tenants' data.

As an alternative to the above-described per-tenant organization of the fingerprint database 138 (or in addition thereto), the fingerprint database 138 may organize fingerprints on a per-client basis, regardless of any tenants to which the clients belong. Thus, the fingerprint database 138 may include separate regions (or separate databases) for respective clients (like client 104a). Arranging the fingerprint database 138 on a per-client basis leverages existing functionality of conventional NAS protocols, which identify the client as part of their normal communications. By contrast, requiring a NAS protocol to specify a tenant may involve additional protocol changes and may face more obstacles to adoption.

Figure 3:
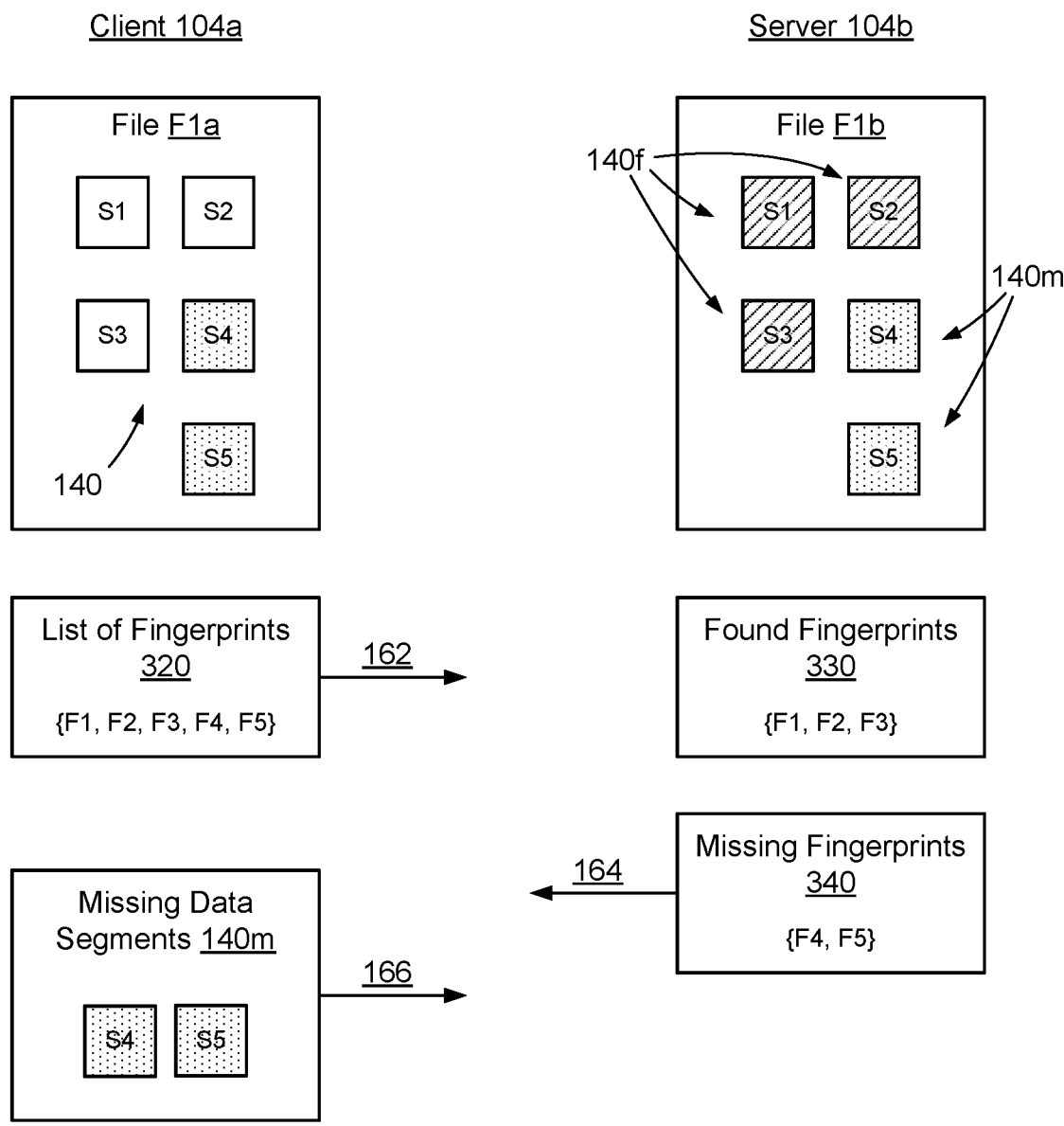
FIG. 3 is a block diagram that shows example files and associated data structures that may be involved in certain embodiments.

FIG. 3 shows additional details of files F1a and F1b and various lists described in connection with FIG. 1. Here, file F1a stored on client 104a is seen to include data segments 140, labeled S1, S2, S3, S4, and S5. The data segments 140 may be data blocks or other data increments. As described previously, the client 104a responds to the request 160 by generating a list of fingerprints, i.e. list 320 of fingerprints 210 of all data segments 140 contained in file F1a. In the example shown, the list 320 includes fingerprints F1, F2, F3, F4, and F5, which the client 104a has generated from the data segments S1, S2, S3, S4, and S5, respectively. As already described, the client 104a sends the list 320 of fingerprints to the server 104b in the first transmission 162.

The server 104b responds to the first transmission 162 by attempting to match each of the fingerprints on the list 320 to a data segment already stored on the server 104b. The result of this attempt is a list 330 of found fingerprints (e.g., F1, F2, and F3) and a list 340 of missing fingerprints (e.g., F4 and F5). The found fingerprints on list 330 correspond to fingerprints 210 (or other identifiers) of data segments on the list 320 that are also stored on the server 104b (and in some cases must be stored for the same tenant or client). The missing fingerprints on list 340 correspond to fingerprints 210 (or other identifiers) of data segments on the list 320 that are not found on the server 104b (or in some cases not found for the same tenant or client, even though they may exist for other tenants or clients). The list 340 of missing fingerprints provides the reply data 164, which the server 104b sends to the client 104a.

Upon receiving the list 340 of missing fingerprints, the client 104a gathers the missing data segments 140m, which correspond to the missing fingerprints in list 340, and sends the missing data segments 140m to the server 104b in the second transmission 166. In some examples, the client 104a compresses the missing data segments 140m prior to transmitting them, thus further reducing network utilization. The server 104b receives the second transmission 166, decompresses the data segments (if necessary), and integrates the previously-missing data segments 140m into the file F1b, along with the found data segments 140f from local storage.

Figure 4:
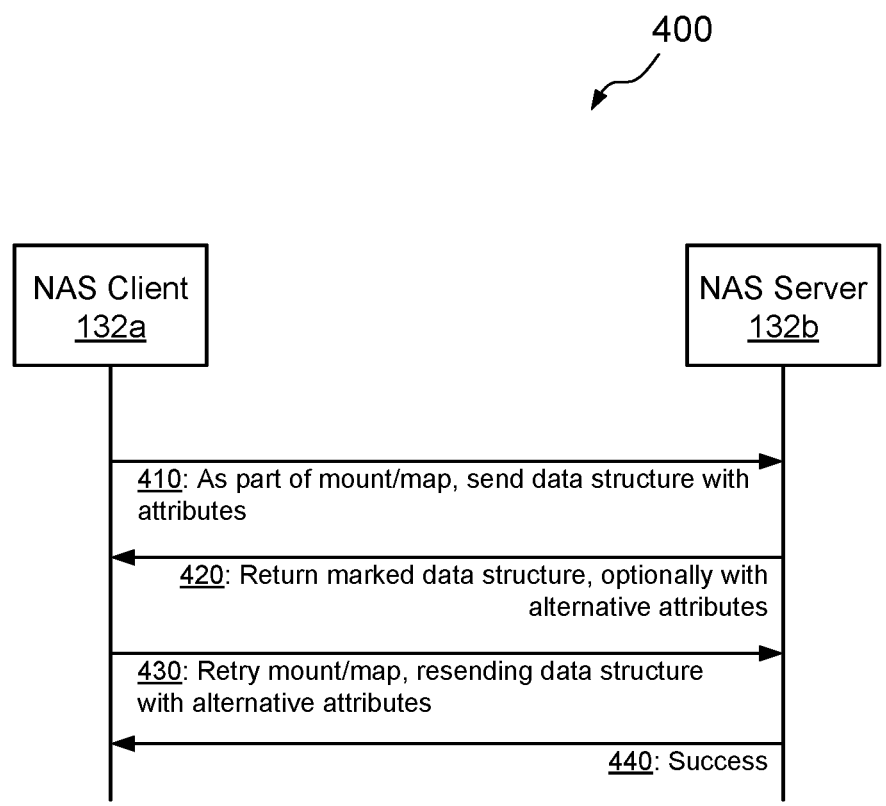
FIG. 4 is a sequence diagram that shows an example method of initializing communications between a NAS client and a NAS server for supporting fingerprint-enabled data transfer.

FIG. 4 shows an example method 400 whereby the NAS client 132a and the NAS server 132b negotiate how fingerprint enabled data transfer may proceed for a designated export or share. The method 400 may take place during an initialization procedure, such as during a mount operation for NFS or during a map network drive operation for CIFS. The method 400 may be used both for extended-attribute implementations and for RPC implementations.

At 410, NAS client 132a sends a data structure to NAS server 132b. The data structure is populated with fields that indicate pertinent attributes that the NAS client 132a supports, such as minimum data segment size, maximum data segment size, fingerprint algorithm to be used (e.g., SHA-1, SHA-2, or some other identifier), data validation type, and so forth.

At 420, the NAS server 132b responds to receipt of the data structure, for example, by marking each attribute in the data structure with a Boolean value, e.g., to indicate whether the server 104b supports the respective attribute. If the server 104b does not support an attribute specified by the data structure, then response at 420 may identify one or more alternative attributes that the server 104b does support, such as a different fingerprint algorithm, data validation type, etc.

At 430, the NAS client 132a may retry the mount or map operation with adjusted attributes that are consistent with the capabilities of the server 104b. A successful result (at 440) indicates that communication attributes for supporting fingerprint-enabled data transfer have been established.

Figure 5:
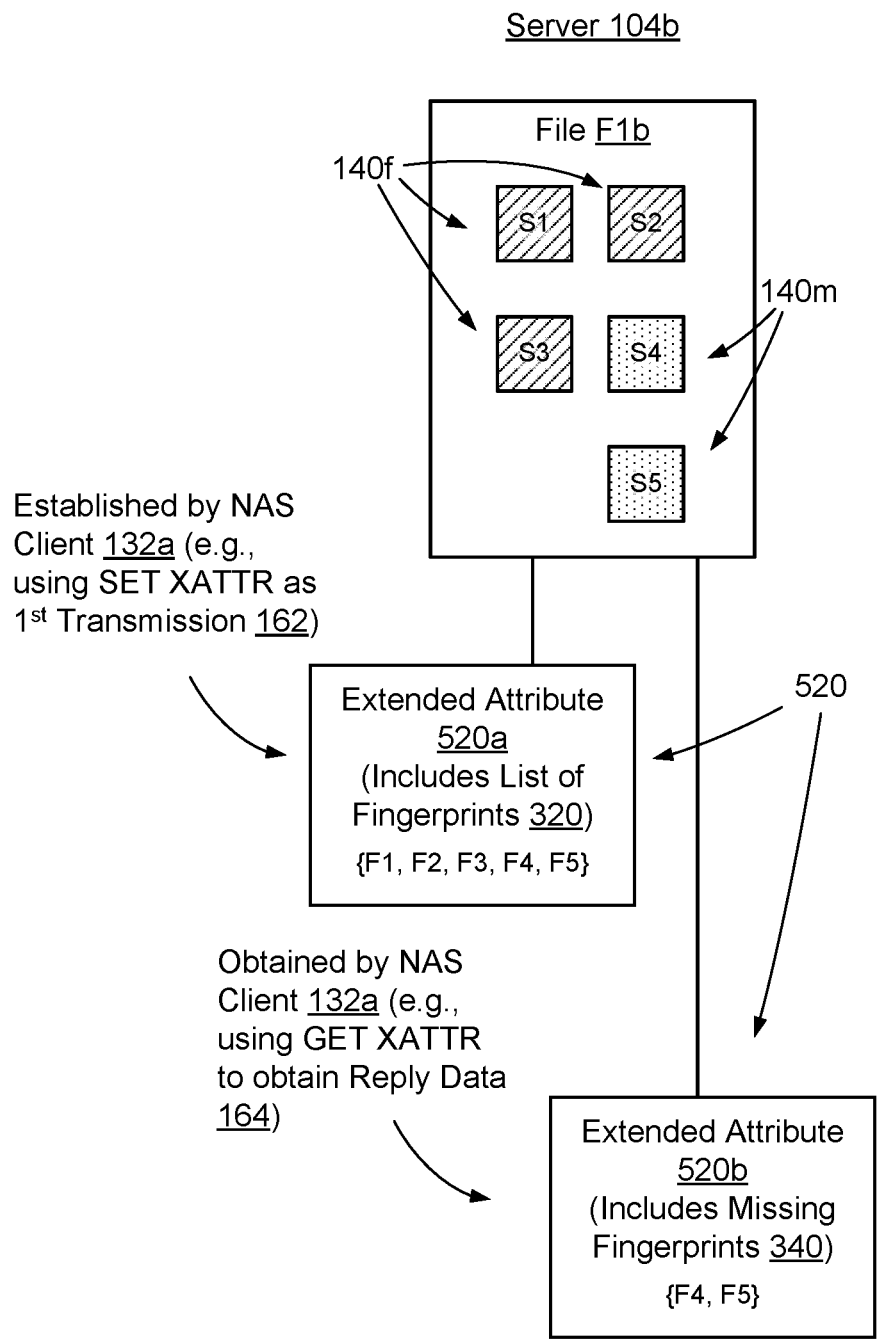
FIG. 5 is a block diagram of an example destination file that uses extended attributes of a NAS protocol to store information that promotes the use of fingerprints for transferring data.

FIG. 5 shows an example implementation of fingerprint-based data transfer that employs extended attributes 520 for managing certain lists. As is known, extended attributes are file attributes, like file size or last-update time, but they are flexible in terms of size and content and are generally opaque to the NAS protocol, which provides functionality to support extended attributes but does nothing with their contents. Thus, extended attributes may store user-defined or application-defined content. Extended attributes are part of the standard definitions of NFSv4 and CIFS. A description of extended attributes in NFSv4 may be found online at https://tools.ietf.org/html/rfc8276, which is hereby incorporated by reference. A description of extended attributes in CIFS may be found online at https://www.kernel.org/doc/readme/Documentation-filesystems-cifs-README, which is hereby incorporated by reference. Although specific implementations of extended attributes differ between NFSv4 and CIFS, it is envisioned that the general approach as described herein may be used with either protocol.

Extended attributes 520 provide a convenient vehicle for supporting fingerprint-enabled data transfer within the context of a NAS protocol. For example, a first extended attribute 520a of file F1b may store the list 320 of fingerprints (FIG. 3). A second extended attribute 520b of file F1b may store the list 340 of missing fingerprints.

In an example, the NAS client 132a on client 104a establishes the extended attribute 520a by sending a SET XATTR command, which specifies the extended attribute 520a, the file F1b, and the list 320 of fingerprints. In response to receiving the SET XATTR command, the NAS server 132b assigns the extended attribute 520a to file F1b, e.g., by creating the extended attribute 520a and linking it to an inode for file F1b, and by copying the list 320 into the new extended attribute 520a.

In an example, the server API 134b on server 104b creates extended attribute 520b to hold the list 340 of missing fingerprints. The NAS client 132b may then obtain the list 340 by issuing a GET XATTR command directed to extended attribute 520b. In response to receiving the GET XATTR command, the NAS server 132b accesses extended attribute 520b and returns its contents as reply data 164 to the NAS client 132a, where the reply data 164 becomes available to the client API 134a.

As an alternative to creating a new extended attribute 520b for the list 340 of missing fingerprints, the server API 134b may instead modify the extended attribute 520a to include information about missing fingerprints, e.g., by assigning a Boolean value to each listed fingerprint in extended attribute 520a. In this example, the GET XATTR command would be directed to extended attribute 520a.

Either way, extended attributes 520 provide an effective mechanism for leveraging a NAS protocol to provide fingerprint-based file data transfer, thus avoiding the need for custom protocols, which can be inconvenient and difficult to maintain. One should appreciate, however, that other mechanisms besides extended attributes may be used for supporting fingerprint-based data transfer, such as RPC. Thus, the use of extended attributes should not be regarded as limiting.

Figure 6:
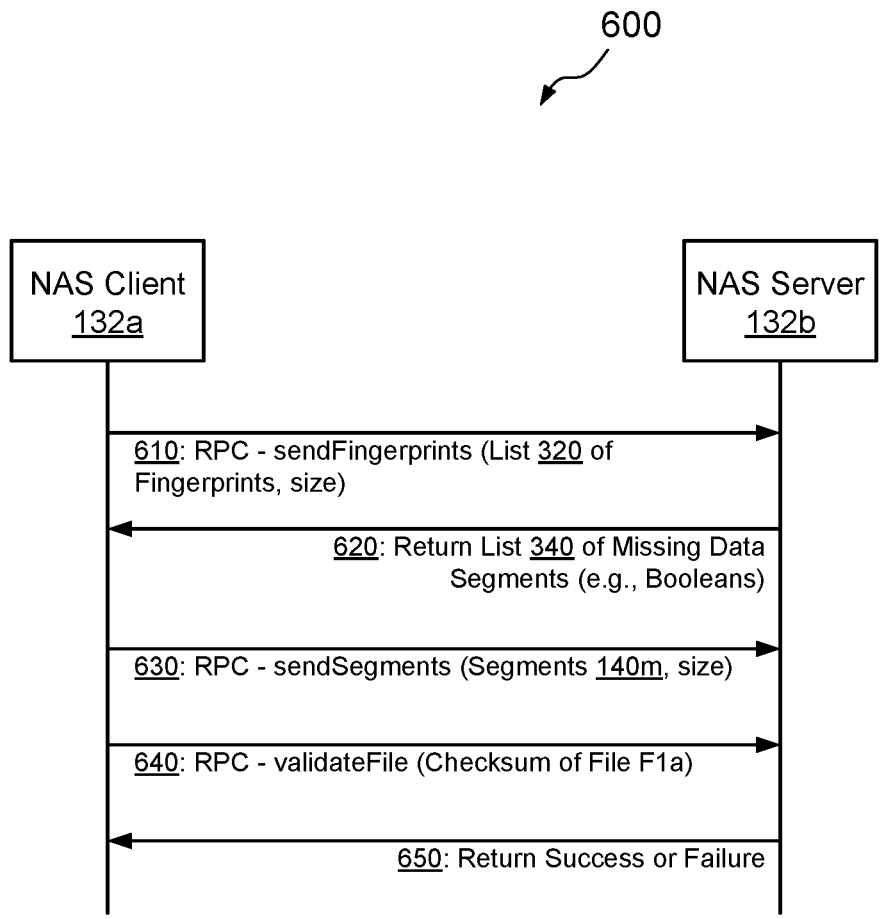
FIG. 6 is a sequence diagram that shows an example method for supporting fingerprint-enabled data transfer using RPC (Remote Procedure Call) supported by the NAS protocol.

FIG. 6 shows an example method 600 for performing fingerprint-enabled data transfer using RPC (Remote Procedure Call). A NAS protocol may use RPC as an alternative to extended attributes or in addition thereto (e.g., both may be used together). Also, support for particular RPC commands and responses, such as those described below, may be incorporated as standard features of a NAS protocol. One should appreciate that RPC solutions may be implemented in a variety of ways and that the particular example provided herein should be regarded as illustrative rather than limiting.

At 610, the NAS client 132a sends an RPC command, referred to herein as "sendFingerprints," to the NAS server 132b. In an example, the sendFingerprints command specifies an array of structures that includes the list 320 of fingerprints and the associated segment size. The sendFingerprints command thus provides an example of the above-described first transmission 162 (FIG. 1)

At 620, the NAS server 132b responds to the sendFingerprints command by returning the above-described list 340 of missing data segments 140m. In an example, the response includes Boolean values that indicate (YES or NO) whether each data segment on the list 320 has been found on the server 104b. The response at 620 thus provides an example of the above-described reply data 164.

At 630, the NAS client 132a sends another RPC command, referred to herein as "sendSegments," to the NAS server 132b. In an example, the sendSegments command provides the missing segments 140m and specifies their size. The sendSegments command thus provides an example of the above-described second transmission 166.

At 640, the NAS client 132a may send yet another RPC command, referred to herein as "validateFile," which provides a checksum of file F1a. In response at 650, the NAS server 132b indicates success or failure, based on whether the received checksum for file F1a matches a checksum computed for file F1b.

Figure 7A:
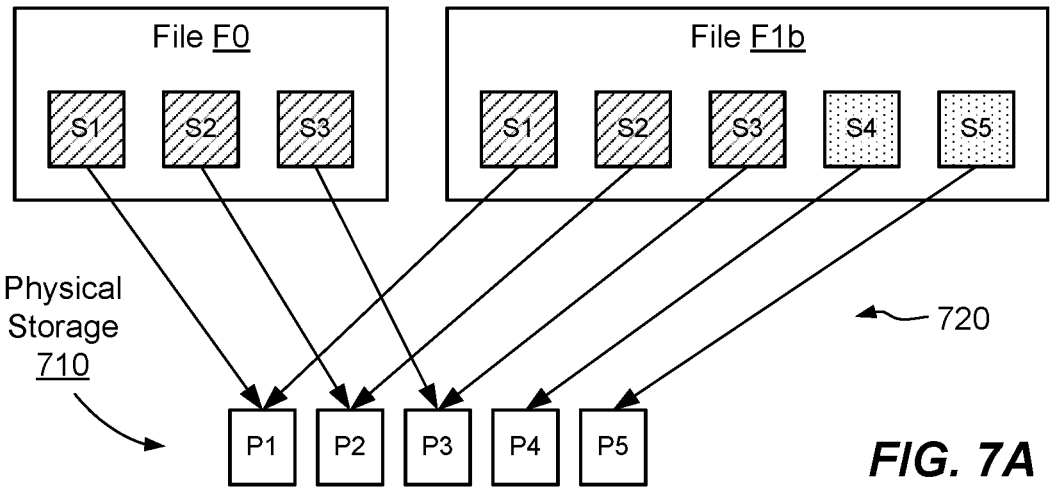
FIGS. 7A and 7B are block diagrams that show example arrangements for organizing data both when the destination supports deduplication (FIG. 7A) and when it does not (FIG. 7B).
Figure 7B:
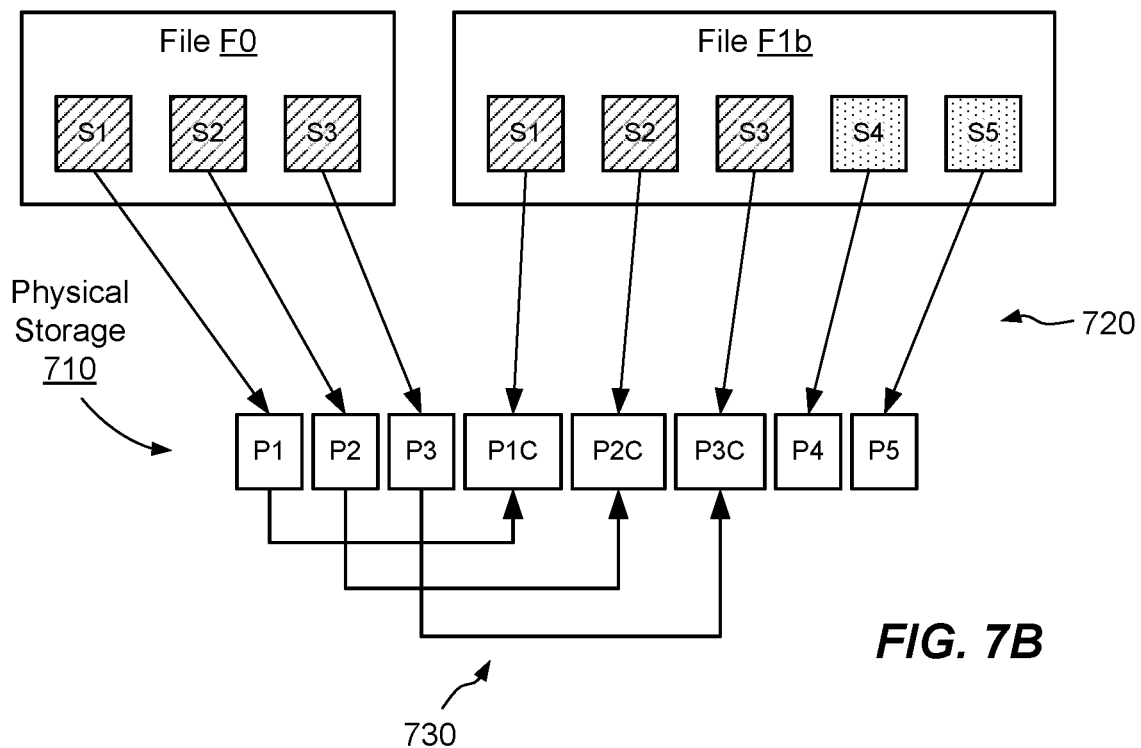

FIGS. 7A and 7B show two example ways in which the server 104b may incorporate data segments into file F1b. Incorporation of data segments takes place in response to receiving the first transmission 162 which provides the list 320 of fingerprints of data segments 140 and the second transmission 166 which provides the missing data segments 140m.

FIG. 7A shows an example in which the server 104b employs a deduplication facility 136b. Here, server 104b has stored a file F0 prior to receiving the first transmission 162. The file F0 includes data segments S1, S2, and S3, which may be regarded as logical data segments. Physical segments P1, P2, and P3 back the logical data segments S1, S2, and S3, respectively. The physical extents represent extents of physical storage 710, such as storage locations on a disk drive. Pointer metadata 720 maps logical data segments S1, S2, and S3 to physical segments P1, P2, and P3.

When the first transmission 162 arrives, server 104b identifies the data segments S1, S2, and S3 as found data segments, and identifies the data segments S4 and S5 as missing. Owing to the action of the deduplication facility 136b, the server 104b reuses physical segments P1, P2, and P3 for backing data segments S1, S2, and S3 of file F1b, effectively inline-deduplicating segments S1, S2, and S3. Physical segments P1, P2, and P3 thus become shared between files F0 and F1b, avoiding redundant storage of P1, P2, and P3.

Deduplication is not available, however, for data segments S4 and S5, as those segments are missing from server 104b. When the missing data segments S4 and S5 arrive, i.e., after receiving the second transmission 166, the server 104b allocates physical segments P4 and P5 and configures pointer metadata 720 to point data segments S4 and S5 to the physical segments P4 and P5.

FIG. 7B shows a similar example, but for the case in which the server 104b does not employ a deduplication facility 136b. As before, file F0 is present on server 104b before the first transmission 162 arrives. In response to arrival of the first transmission 162, the server 104b identifies segments S1, S2, and S3 as found and identifies segments S4 and S5 as missing. As deduplication is unavailable, the server 104b allocates a respective physical segment for each of the segments S1-S5 in file F1b. To populate the contents of found segments S1, S2, and S3 of file F1b, the server 104b copies P1 to P1C, P2 to P2C, and P3 to P3C (see arrows 730). When the second transmission 166 conveying the missing segments S4 and S5 arrives, the server 104b stores the formerly-missing segments in P4 and P5. Although the arrangement of FIG. 7B involves copying of physical segments P1, P2, and P3 and fails to avoid redundancy, the copying of P1, P2, and P3 is local to the server 104b and does not require a copy over the network 106. Thus, the arrangement of FIG. 7B still delivers benefits in terms of reducing network traffic.

Figure 8:
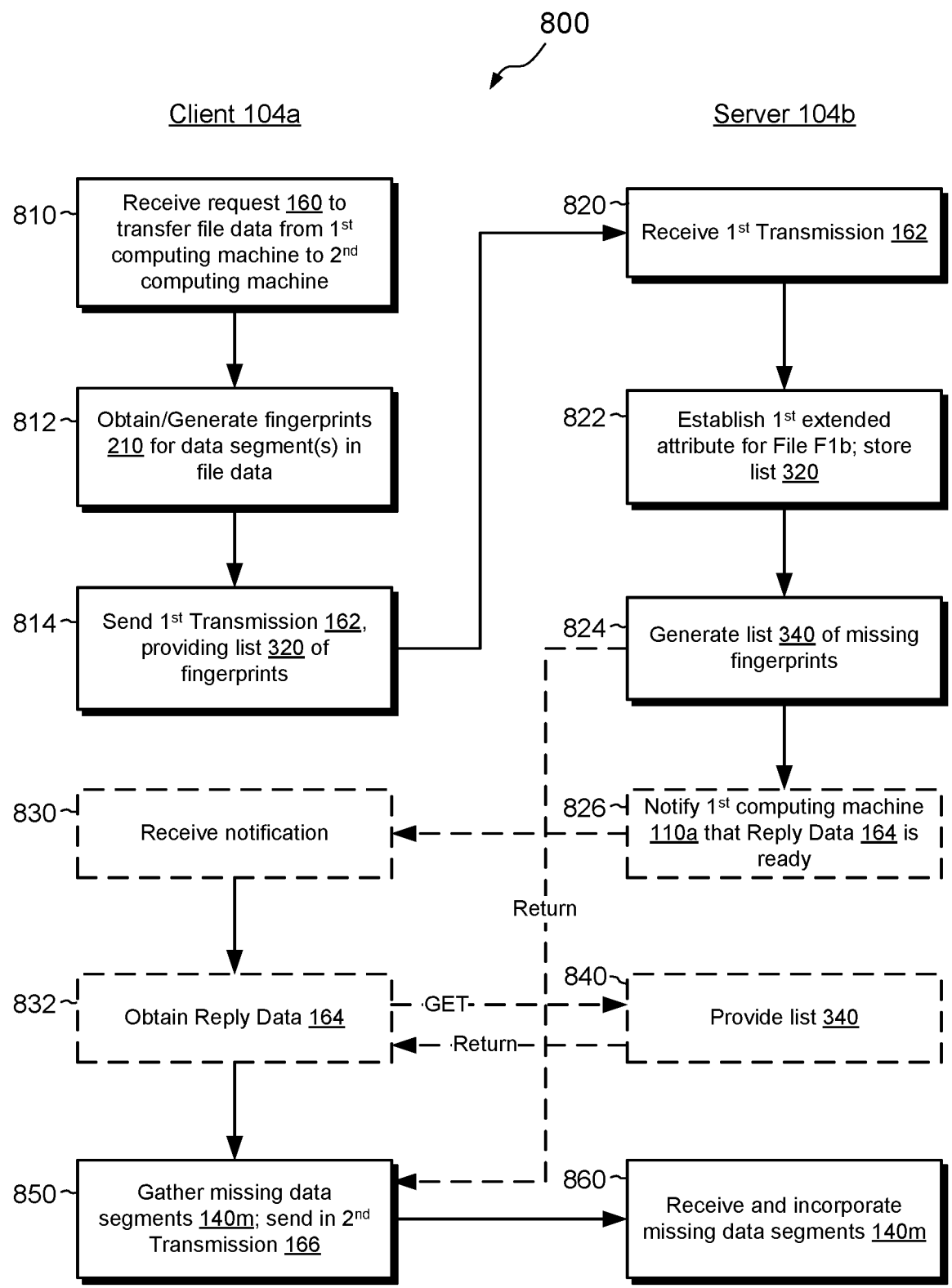
FIG. 8 is a flowchart that shows an example method for transferring data, which method may be carried out in the environment of FIG. 1.

FIG. 8 shows an example method 800 that may be carried out in connection with the environment 100 and provides a summary of some of the features described above. The method 800 is typically performed, for example, by the software constructs described in connection with FIG. 1, which reside in the memories 130a and 130b of computing machines 104a and 104b and are run by the set of processors 120a and 120b. Acts performed by the client 104a (first computing machine 104a) are shown in the column to the left, and acts performed by the server 104b (second computing machine 104b) are shown in the column to the right. The various acts of method 800 may be ordered in any suitable way. Accordingly, embodiments may be constructed in which acts are performed in orders different from that illustrated, which may include performing some acts simultaneously.

At 810, the client 104a receives a request 160 to transfer specified file data to the server 104b. The request 160 may result from a user command (e.g., from user 102), from an internal activity (e.g., backup or replication), from another computer, or from some other source. The request 160 may identify the file data based on a file name and logical offset range, based on a file handle, or in any other suitable way. For this example, we assume that the specified file data identifies file F1a on the client 104a.

At 812, the client 104a obtains and/or generates fingerprints 210 for the data segments 140 contained in the file data specified by the request 160. For example, the client 104a accesses fingerprints 210 from the fingerprint database 138a, and/or generates fingerprints in response to request 160 by applying a cryptographically-secure function (e.g., SHA-1 or SHA-2) and/or by applying a non-cryptographically-secure methodology that is shared between the client 104a and the server 104b.

At 814, the client 104a sends the first transmission 162, which includes the list 320 of fingerprints, to the server 104b. In one example, the NAS client 132a sends the first transmission 162 by issuing a SET XATTR command that assigns the list 320 of fingerprints to a specified extended attribute 520a of file F1b. In another example, the NAS client 132b sends the first transmission via an RPC command, such as the above-described sendFingerprints command.

At 820, the server 104b receives the first transmission 162, e.g., via the NAS server 132b. If using extended attributes, the server 104b at 822 establishes the extended attribute 520a for the file F1b. If file F1b does not yet exist, the NAS server 132b may create file F1b at this time. The NAS server 132b stores the list 320 in the extended attribute 520a. If using RPC, the server 104b may parse the parameters of the sendFingerprints command and store them in local memory. The NAS server 132b may also create file F1b if it does not already exist.

At 824, the server 104b generates the list 340 of missing fingerprints, which corresponds to missing data segments 140m. If using extended attributes, the server 104b stores the list 340 of missing fingerprints as reply data 164 in extended attribute 520b, or in extended attribute 520a, e.g., by providing a Boolean value to identify present and missing fingerprints. If using RPC, the server 104b may return the list 340 of missing attributes to the client 104a as a response to the sendFingerprints command. In some examples, generating the list 340 of missing fingerprints involves limiting the scope of fingerprints searched or computed to those belonging to a particular tenant or client.

At 826, the server 104b notifies the client 104a that reply data 164 is ready. At 830, the client 104a receives the notification. These acts may be optional in implementations that use RPC, as the server 104b may return reply data 164 automatically in response to the sendFingerprints command.

At 832, the client 104a obtains the reply data 164. If using extended attributes, the client 104a issues a GET XATTR command directed to extended attribute 520b (or 520a). At 840, the NAS server 132b on the server 104b receives the GET XATTR command and responds by returning the contents of the requested extended attribute 520b (or 520a). These acts 832 and 840 may also be optional in implementations that use RPC.

At 850, the client 104a gathers the missing data segments 140m and sends them in the second transmission 166. When using extended attributes, the second transmission 166 does not involve the use of extended attributes 520 but rather may involve sending the missing data segments 140m as payload in an ordinary NAS data transfer. If using RPC, the second transmission 166 may be performed via a sendSegments command 630.

At 860, the server 104b receives the missing data segments 140m and incorporates them into file F1b, e.g., using the approach described above in connection with FIG. 7A or FIG. 7B. Optionally, data validation may be performed by comparing checksums of files F1a and F1b, as described in connection with FIG. 6.

At the conclusion of method 800, file F1b on the server 104b stores an independent version of file F1a on the client 104a. But the server 104b did not have to receive over the network 106 data segments that were found on the server 104b.

An improved technique has been disclosed for transferring data over a network 106. The technique leverages a standard NAS (Network Attached Storage) protocol, such as NFS of CIFS, to augment the inherent file-copying ability of the protocol with fingerprint matching, enabling the NAS protocol to limit its data copying over the network to unique data segments 140m while avoiding copying of redundant data segments 140f. Advantageously, significant stress on the network 106 is avoided, promoting performance of any applications using the network and improving user experience. Maintenance and software management are also improved, as the standard NAS protocol avoids the need for an extra, custom protocol.

Having described certain embodiments, numerous alternative embodiments or variations can be made. Although features have been shown and described with reference to particular embodiments hereof, such features may be included and hereby are included in any of the disclosed embodiments and their variants. Thus, it is understood that features disclosed in connection with any embodiment are included in any other embodiment.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, the terms "based on" and "based upon" should be interpreted as meaning "based at least in part on" or "based at least in part upon," as bases need not be exclusive unless explicitly stated. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A method of transferring data between computing machines over a network, the method comprising:
in response to a first computing machine receiving a request to transfer file data to a second computing machine, sending, via a NAS (Network Attached Storage) protocol configured to perform fingerprint-enabled data transfer, a first transmission to the second computing machine over the network, the first transmission including multiple fingerprints that identify respective data segments of the file data;
receiving, via the NAS protocol responsive to fingerprint matching performed by commands of the NAS protocol, reply data from the second computing machine, the reply data specifying missing data segments, the missing data segments being data segments, identified by the fingerprints in the first transmission, which are unavailable on the second computing machine; and
in response to receiving the reply data, sending, via the NAS protocol, a second transmission to the second computing machine, the second transmission providing the missing data segments to the second computing machine,
wherein the file data includes data for a particular file on the second computing machine, wherein the NAS protocol supports extended attributes of files, wherein sending the first transmission includes providing the fingerprints as at least a first extended attribute associated with the particular file using at least one SET XATTR command, and wherein receiving the reply data is responsive to sending at least one GET XATTR command to the second computing machine.

2. The method of claim 1, wherein the first computing machine operates as a NAS client and the second computing machine operates as a NAS server.

3. The method of claim 2, wherein the NAS protocol is one of NFS (Network File System) and CIFS (Common Internet File System).

4. The method of claim 3, wherein the NAS protocol is NFSv4 or greater.

5. The method of claim 3, wherein the NAS protocol supports RPC (Remote Procedure Call), and wherein sending the first transmission includes providing the fingerprints in at least one RPC command.

6. The method of claim 3, further comprising generating the fingerprints as cryptographically secure hashes of the respective data segments of the file data, wherein generating the fingerprints is performed prior to receiving the request to transfer the file data and as part of a deduplication facility operating on the first computing machine.

7. The method of claim 3, further comprising generating the fingerprints as cryptographically secure hashes of the respective data segments of the file data, wherein generating the fingerprints includes generating at least some of the fingerprints in response to receiving the request to transfer the file data.

8. The method of claim 3, further comprising generating the fingerprints by the first computing machine as non-cryptographically secure identifiers according to a predetermined methodology shared between the first computing machine and the second computing machine.

9. The method of claim 3, wherein the method further comprises compressing the missing data segments prior to sending the second transmission.

10. The method of claim 1, further comprising, prior to receiving the reply data, sending a command to the second computing machine requesting at least a second extended attribute associated with the particular file.

11. A computer program product, including a set of non-transitory, computer-readable media having instructions which, when executed by a controller of a computerized apparatus, cause the computerized apparatus to perform a method of transferring data over a network, the method comprising:
operating a NAS (Network Attached Storage) server configured to share or export files over the network;
receiving, via a NAS protocol of the NAS server, a first transmission from a computing machine that operates a NAS client, the first transmission including multiple fingerprints that identify respective data segments of file data, the NAS protocol configured to perform fingerprint-enabled data transfer;
transmitting, via the NAS protocol responsive to fingerprint matching performed by commands of the NAS protocol, reply data to the computing machine, the reply data specifying missing data segments, the missing data segments being data segments, identified by the fingerprints in the first transmission, which are unavailable on the computerized apparatus; and
after transmitting the reply data, receiving, via the NAS protocol, a second transmission from the computing machine, the second transmission providing the missing data segments,
wherein the file data includes data of a particular file, wherein the NAS protocol is NFSv4 or greater and supports extended attributes of files, and wherein the method further comprises, in response to receiving the first transmission, storing the fingerprints in at least a first extended attribute of the particular file, wherein the first transmission is received as part of at least one SET XATTR command, and wherein the reply data is transmitted in response to at least one GET XATTR command.

12. The computer program product of claim 11, wherein the method further comprises:
generating a list of missing fingerprints as fingerprints received in the first transmission that do not match any local fingerprints generated for data segments stored in the computerized apparatus,
wherein transmitting the reply data includes providing indicators of data segments identified by the list of missing fingerprints.

13. The computer program product of claim 12, wherein the method further comprises performing a handshaking procedure with the NAS client during a mount or map operation, the handshaking procedure establishing attributes to be used in supporting fingerprint-enabled data transfer between the NAS client and the NAS server.

14. The computer program product of claim 12, wherein the computerized apparatus employs a deduplication facility, and wherein the method further comprises, after receiving the first transmission that includes the fingerprints:

identifying a plurality of found fingerprints as fingerprints received in the first transmission that match fingerprints generated for data segments stored in the computerized apparatus; and for each of the plurality of found fingerprints, storing the respective data segment by configuring pointer metadata and without persistently storing a new copy of the respective data segment.

15. The computer program product of claim 12, wherein the computerized apparatus supports multiple tenants, wherein the computing machine belongs to a particular tenant, and wherein, when generating the list of missing fingerprints, the method comprises limiting a scope of fingerprints searched to a plurality of fingerprints specific to the particular tenant.

16. A computerized system, comprising a first computing machine operatively connected to a second computing machine over a network, the computerized system constructed and arranged to:

receive, by the first computing machine, a request to transfer file data to the second computing machine, send, by the first computing machine via a NAS (Network Attached Storage) protocol configured to perform fingerprint-enabled data transfer, a first transmission to the second computing machine, the first transmission including multiple fingerprints that identify respective data segments of the file data;

transmit, by the second computing machine via the NAS protocol responsive to fingerprint matching performed by commands of the NAS protocol, reply data to the first computing machine, the reply data specifying missing data segments, the missing data segments being data segments, identified by the fingerprints in the first transmission, which are unavailable on the computerized apparatus; and in response to receiving the reply data by the first computing machine, send, by the first computing machine via the NAS protocol, a second transmission to the second computing machine, the second transmission providing the missing data segments to the second computing machine, wherein the file data includes data for a particular file on the NAS server, wherein the NAS protocol supports extended attributes of files, wherein the computerized system constructed and arranged to send the first transmission is further constructed and arranged to provide the fingerprints as at least a first extended attribute associated with the particular file using at least one SET XATTR command, and wherein the computerized system is further constructed and arranged to transmit the reply data responsive to at least one GET XATTR command sent to the second computing machine.

17. The computerized system of claim 16, wherein the request to transfer file data specifies data to be copied from a file in the first computing machine to a file in the second computing machine, and wherein the computerized system is further constructed and arranged to perform a validation on the file in the second computing machine after sending the second transmission, the validation including (i) comparing a first checksum computed from the file in the first computing machine with a second checksum computed from the file in the second computing machine and (ii) producing a successful result responsive the first checksum matching the second checksum.

* * * * *